United States Patent [19]
Cheung et al.

[11] Patent Number: 6,070,225
[45] Date of Patent: May 30, 2000

[54] METHOD AND APPARATUS FOR OPTIMIZING ACCESS TO CODED INDICIA HIERARCHICALLY STORED ON AT LEAST ONE SURFACE OF A CYCLIC, MULTITRACKED RECORDING DEVICE

[75] Inventors: Wayne Cheung; Mohammed Amine Hajji, both of San Jose, Calif.

[73] Assignee: International Business Machines Corporation, Armonk, N.Y.

[21] Appl. No.: 09/088,412

[22] Filed: Jun. 1, 1998

[51] Int. Cl.[7] .................................................. G06F 12/00
[52] U.S. Cl. .......................... 711/112; 711/159; 711/160
[58] Field of Search .................................. 711/112, 133, 711/136, 159, 160, 168, 114; 369/48; 707/206

[56] References Cited

U.S. PATENT DOCUMENTS

| | | | |
|---|---|---|---|
| 4,207,609 | 6/1980 | Luiz et al. | 395/858 |
| 4,533,995 | 8/1985 | Christian et al. | 395/250 |
| 4,916,605 | 4/1990 | Beardsley et al. | 395/489 |
| 5,087,992 | 2/1992 | Dahandeh et al. | 360/31 |
| 5,263,145 | 11/1993 | Brady et al. | 395/441 |
| 5,381,539 | 1/1995 | Yanai et al. | 395/460 |
| 5,422,761 | 6/1995 | Anderson et al. | 360/47 |
| 5,422,762 | 6/1995 | Jerbic | 360/48 |
| 5,422,763 | 6/1995 | Harris | 360/51 |
| 5,500,848 | 3/1996 | Best et al. | 369/275.3 |
| 5,717,893 | 2/1998 | Mattson | 395/456 |
| 5,793,555 | 8/1998 | Belser et al. | 360/75 |
| 5,799,324 | 8/1998 | McNutt et al. | 707/206 |
| 5,812,996 | 9/1998 | Rubin et al. | 707/2 |

*Primary Examiner*—Do Hyun Yoo
*Assistant Examiner*—Mehdi Namazi
*Attorney, Agent, or Firm*—G. Marlin Knight

[57] ABSTRACT

Access can be optimized to data strings hierarchically organized on a single disk drive where the data strings are address map defined and recorded in bands of contiguous tracks on a frequency usage basis. The bands are arranged such that each of the most frequently used strings are out-of-phase recorded several times on a counterpart track where the band is located toward the outer disk diameter. The least frequently used strings and sequential data strings are stored elsewhere on the same or other surfaces. A group of three or more bands provides for a more refined partitioning of the data strings on a frequency of usage or a recency of usage basis. The read/write transducer has its idle position over the outer diameter.

14 Claims, 5 Drawing Sheets

Disk Drive Control Flow Detail for Managing Hierarchical Storage

FIG. 4  Disk Drive Control Flow Detail for Managing Hierarchical Storage

METHOD AND APPARATUS FOR OPTIMIZING ACCESS TO CODED INDICIA HIERARCHICALLY STORED ON AT LEAST ONE SURFACE OF A CYCLIC, MULTITRACKED RECORDING DEVICE

FIELD OF THE INVENTION

This invention relates to disk drive-based, hierarchical, demand/responsive storage systems, subsystems, or the like, and more particularly to the optimization of access to data hierarchically arranged among the surfaces of a synchronous disk drive portion of the subsystem.

DESCRIPTION OF RELATED ART

In this specification, the terms data string, coded indicia, unit of data, or stageable unit of storage are used interchangeably. Disk-based storage subsystems, such as the IBM 3990/3390 operating under MVS, are sometimes tuned to stageable units of storage, such as the IBM 3390 disk track. Other systems, such as SCSI disk drives, are tuned to fixed-block extents of a predetermined number of bytes recorded on a portion of a physical or logical track.

Disk Drive Access Time Limits

In the prior art it has been long recognized that the electromechanical structure of moving magnetic or optical storage devices inherently limit the access speed, the data rate, and the concurrency between the devices in an external storage subsystem and an accessing host CPU or network. Thus, where a data string is to be transferred to or from a cyclic, multitracked storage device, several preparatory operations must be undertaken. These include the dispatch and execution of instructions for selecting the device, positioning a transducer over the disk drive cylinder and track of interest, and waiting until the desired portion of the track rotates under the transducer before commencing the transfer. Two broad solutions have been used to minimize these delays upon system performance. These involve either (1) the use of redundant paths between the requesting host and the device storing the data and overlap of accessing operations, or (2) placing the frequently used data closer to the host-executing application.

Subsystem Resolution Through Redundant Paths and Operation Overlapping

Luiz et al., U.S. Pat. No. 4,207,609, "Method and Means for Path Independent Device Reservation and Reconnection in a Multi-CPU and Shared Device Access System", issued Jun. 10, 1980, illustrates subsystem access time reduction. Luiz invokes redundant and highly available transfer paths and overlapping of storage subsystem operations across several devices at a time. In Luiz, a path between a first accessing CPU to a device through intermediate control points would be released to a contending second or a third CPU when a disk device arm was dispatched responsive to a command repositioning the arm of a disk drive. The path would then be reengaged to any requesting CPU.

Another example may be found in Brady et al., U.S. Pat. No. 5,263,145, "Method and Means for Accessing DASD Arrays with Tuned Data Transfer Rate and Concurrency", issued Nov. 16, 1993. Brady discloses the use of a single parameter to vary the percentage of parallelism and overlap as the percentage of data throughput and application concurrency varies in contemporary RAID 3 disk arrays and RAID 5 disk arrays. In RAID 5 configurations, some reduction in data rate is made in order to achieve higher concurrency.

Subsystem Resolution Though Cache/Front Store Data Placement

In the 1970s, semiconductor caches or buffers were prohibitively expensive. Disk storage subsystem control units of that era, such as the IBM 3830/3330, possessed only a single-track buffer or less. However, in the late 1980s and early 1990s, as electronic memory became more affordable, storage subsystems were formed from a large fast cache front store and very large and slower disk array backing stores.

Yanai et al., U.S. Pat. No. 5,381,539, "System and Method for Dynamically Controlling Cache Management", issued Jan. 10, 1995, illustrate another way of reducing the time required to access subsystem stored data. In Yanai, the most frequently referenced data is located in a form of semiconductor cache storage. This is inherently faster than moving magnetic disk devices. In such cache-based and disk-backed storage subsystems, the cache is managed according to a least recently used (LRU) cache discipline. This means that all read references are read from cache, and any reference not already in cache is staged up from a backing store. If the cache is full then the oldest LRU entry is destaged or written over as the newly referenced data is staged up from disk. If the LRU cache is volatile, then any write references can be copied over to a nonvolatile write cache and a completion signal sent to the source. This latter precept is taught in Beardsley et al., U.S. Pat. No. 4,916,605, "Fast Write Operations", issued Apr. 10, 1990.

The important point is that a large cache masks out any irregularities and variations in the speed with which data is accessed from a disk-based backing store. While the LRU discipline was optimal for random cache referencing, its access speed advantage was greatly reduced in the presence of sequential referencing. However, in the presence of sequential referencing, resort is usually made to some form of data prefetch. That is, a storage controller detects a predetermined number of sequential read references as proposed by Christian et al., U.S. Pat. No. 4,533,995, "Method and System for Handling Sequential Data in a Hierarchical Store", issued Aug. 6, 1985.

Resolution by Disk Drive Tuning

Unfortunately, cache-managed storage subsystems achieve their subsystem performance while utilizing significant operating system programming and bandwidth resources. This introduces significant degrees of subsystem cost and complexity insofar as control, maintenance,, and availability are concerned. One alternative is to refocus on the disk drive itself.

The prior tuning of the disk drive to improve access time has been centered on tuning the device geometry, recording, sensing, and error control technologies. Other factors to be considered are typing or categorizing the data from a storage management view, recording the typed data at an access efficient location on the disk, and using an instance, in Anderson et al., U.S. Pat. No. 5,422,761, "Disk Drive with Redundant Recording", issued Jun. 6, 1995. Anderson disclosed dual recording of a data string 180 degrees out of phase on the same track and at an above average track density to reduce disk latency. Another instance may be found in Dahandeh et al., U.S. Pat. No. 5,087,992, "Method for Assigning Tracks on a Magnetic Data Storage Disk to Different Read/Write Frequency Zones", issued Feb. 11, 1992. Dahandeh records data strings on tracks having predetermined or associated error statistics and at a recording frequency unique to that track or group of tracks.

SUMMARY OF THE INVENTION

It is accordingly an object of this invention to devise a method and apparatus for optimizing access time to coded indicia, data strings, or the like located on the surfaces of a cyclic, multitracked storage device.

It is a related object that such method and apparatus reduce dependency upon subsystem or system resources that effectuate storage and management of the coded indicia, data strings, or the like.

It is a related object that such method and apparatus effectively utilize disk recording technologies, such as zone data recording (ZDR) and dual recording, or the like.

It is yet another related object that such method and apparatus be included to the direct tuning of standalone disk storage devices operative by themselves as to be found in open systems attachable devices, such as the IBM 7190 subsystem, attachable as in the IBM Ultrastar 9LP and 18XP disk drives, or when installed in network servers as the IBM 3466 Network Storage Manager, or the like.

The foregoing objects are believed satisfied by a method and apparatus for optimizing access to addressable data strings stored on a plurality of disk surfaces in a cyclic, multitracked disk drive. The method comprises the steps of recording one or more data strings in counterpart tracks on at least a first disk surface according to a particular discipline, and accessing the disk while maintaining that discipline over the life of the data strings on the disk according to a demand model or an access performance model.

In this invention, a predetermined number of tracks on each disk surface constitute a band,, and at least a first and a second band are formed. Relatedly, the data strings are stored in a designated one of the bands according to frequency of usage or a recency of usage and sequentiality of access discipline. Significantly, the recording step includes out-of-phase recording several times over of the most frequently used (MFU) or most recently used (MRU) randomly accessed data strings. The out-of-phase recording is written on the tracks of the first band. It is further significant that the first band is located substantially toward the outer diameter of a disk surface.

The demand model includes a logical map stored and referenced within the disk drive. It defines the location and size of the bands of tracks and migration operations involving the disk drive processor and servo controller. In this regard, the demand model is the construct recording the frequency of access and the sequential nature of data strings. Also, the demand model is consulted as part of the interpretation by the disk drive processor of each externally originated access request. Likewise, it is consulted in the migration of data strings from one band to another in the maintenance of a least frequently used (LFU) or a least recently used (LRU) ordering among the bands.

In the invention, the recording step further includes solely recording (making a single copy) on the tracks of at least a second band. The second band contains two types of data. These include both the LFU and LRU randomly accessed data strings and the sequentially accessed data strings. The second band may be located elsewhere on the disk, including the inner diameter of a disk surface.

The accessing of at least one data string from the counterpart first or second bands of tracks is responsive to external commands. As previously mentioned, accessing also involves selectively migrating one or more data strings among the bands to maintain an ordering of data strings among the bands according to the recency of usage and sequentiality of access discipline. Of some importance is the fact that the recording of MFU/MRU and LFU/LRU data strings is arranged such that the track density in bits per inch varies directly as its diametric distance from the disk axis of rotation.

The MFU/MRU data strings can be out-of-phase recorded in one of several ways. This includes dual recording an MFU/MRU data string 180 degrees out of phase about a first track in the first band. Alternatively, the MFU/MRU data string can be recorded on the first track in the first band on the first disk surface, and a copy recorded on the first track in the first band of the second disk surface on the same cylinder but out of phase by 180 degrees.

When the method involves accessing the disk and migrating data strings among the bands according to the demand model, special attention is paid to sequential referencing. Data strings involving sequential accessing, including raster-scanned data, graphic images, or the like, are stored in the LFU/LRU band.

The invention further contemplates that a more graduated set of bands and disk surface locations can be used as where data strings are partitioned into three groups (A, B, C) according to a recency of usage discipline. Indeed, these groups may be spread over five or ten disk surfaces depending on the limits of the spindle and capacity availability. The data strings in Group A are the ones most recently referenced and are out-of-phase recorded multiple times on a band of extra-wide tracks on the outside diameter of a disk following a ZDR scheme. Further, the data strings in Group B are the ones next most recently referenced. The Group B data strings are out-of-phase recorded multiple times on a band of tracks of usual width located on an inner diameter of the disk. Lastly, the data strings in Group C are by far the largest in number. The Group C data strings are either least recently referenced or are sequentially referenced. The Group C members are written only one time each on one or more bands of tracks of usual width. The data strings of Group C occupy, if required, several disk surfaces, including the innermost diameter of the disk.

DESCRIPTION OF THE PREFERRED EMBODIMENT

Figure 1:
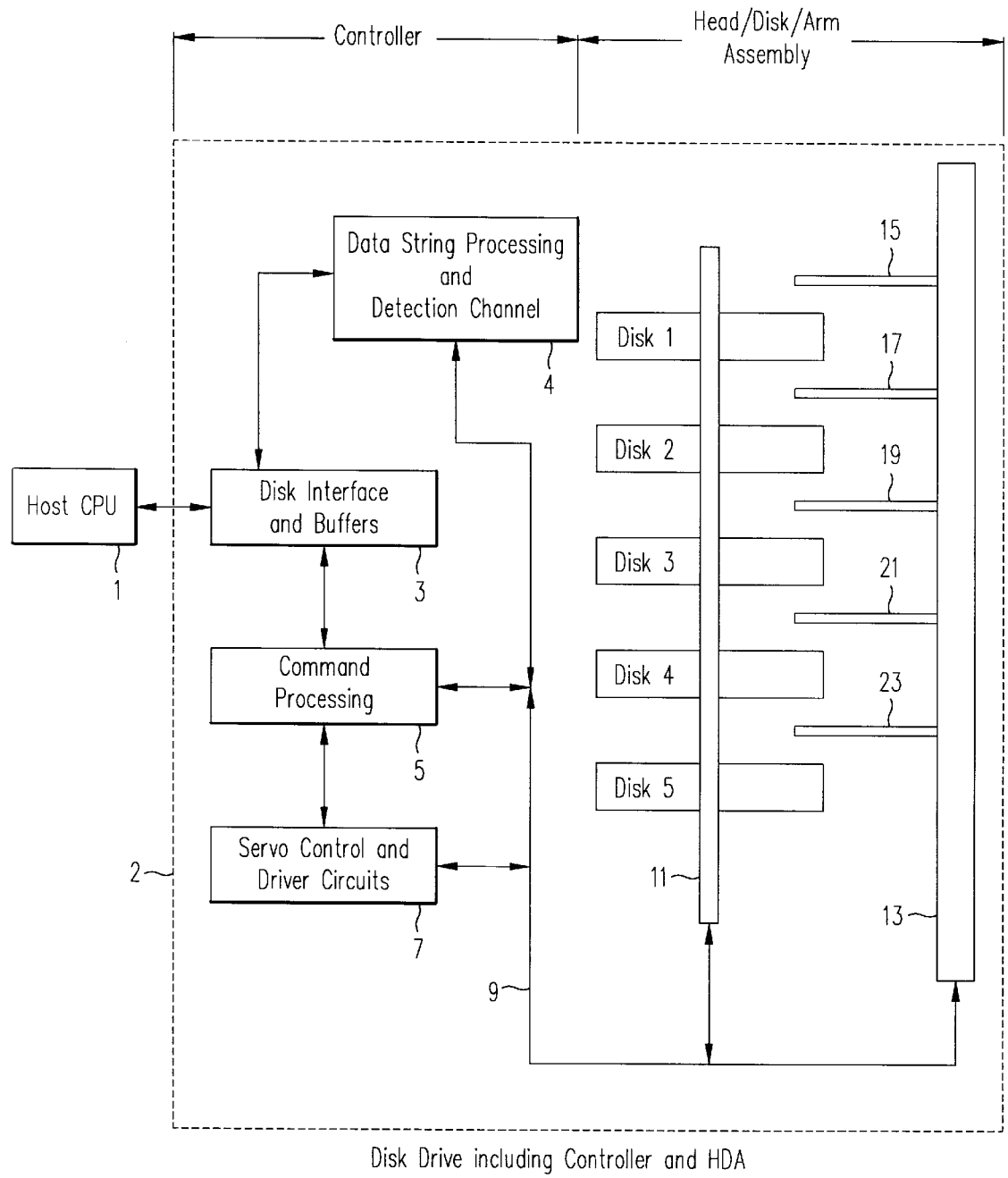
FIG. 1 shows a logical flow for a disk drive including a controller and an HDA according to the prior art.

Referring now to FIG. 1, there is shown an abbreviated logical flow for a disk drive 2 including a controller and a head, disk, and arm assembly (HDA) according to the prior art. Applications executing on a host CPU 1 invoke read and write requests through the host operating system. These requests, in addition to the passage of data, are transferred between the host and the disk interface 3. A processor 5 interprets the access requests and the logical address information. The processor converts the logical addresses into real or physical addresses and notifies the servo controller 7. In disk drive 2, data strings are stored in circular tracks on a plurality of disks, namely disk 1 through disk 5, concentrically mounting a shaft 11 and rotating at a constant speed in the range of thousands of RPM. A plurality of transducer-tipped arms 15–23 are comb attached to structure 13. The servo causes structure 13 and the arms 15–23 to move radially toward or away from the axis of rotation or spindle 11. In modern disk drives, each track has at least one servo sector. The servo sector is sensed by the transducer and provides cylinder and track ID. This indication serves to drive the servo error signal to zero and therefore satisfy the read or write starting address positioning requirement.

Figure 2:
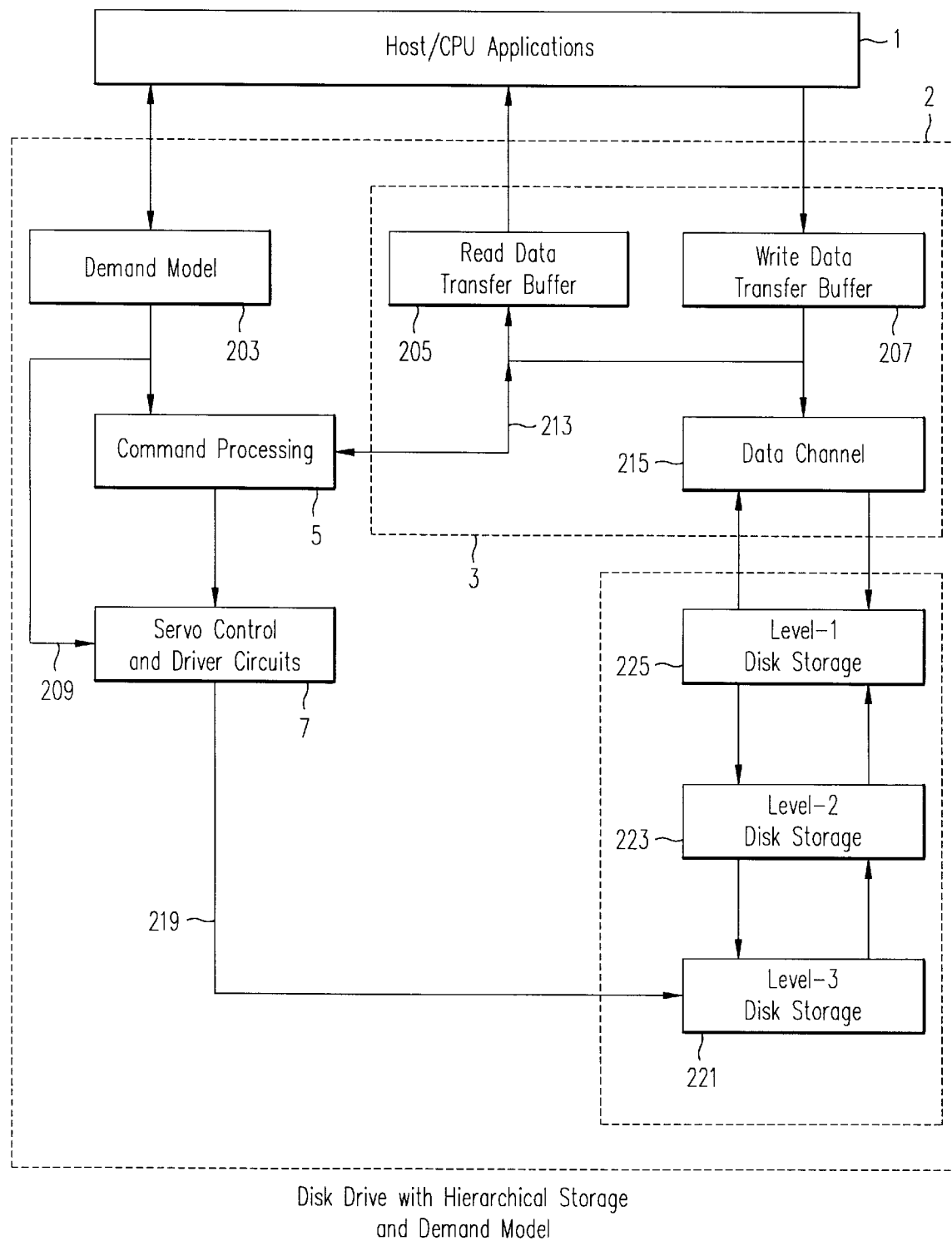
FIG. 2 depicts a logical flow of control and data path for a hierarchically organized disk drive running under a demand model according to the invention.

Referring now to FIG. 2, there is depicted a more complete logical flow of control and data path for a hierarchically organized disk drive running under a demand model according to the invention. In this embodiment, there is shown a data transfer path 3 responsive to the streaming of data strings either from the host for recording on the disk tracks 207, 215 or read from the disk tracks for delivery 215, 205 to the host 1. The embodiment also includes a command path 203, 5, 7, 219 responsive to the read and write requests from host applications 1. The requests are filtered through the demand model 203 for ascertaining the real address of target track and data string, and causing the servo control 7 to position the HDA over the cylinder and track address of interest.

Significantly, referring again to FIG. 2 when taken together with FIG. 1, a typical HDA comprises five disks rotating at a constant speed of 4500 RPM having an average latency time of 6.7 milliseconds. If data strings are recorded according to the invention in bands of tracks in a predetermined location pattern on selected disk surfaces according to a recency of usage discipline, then an average latency time for the same device geometry can be reduced to 3.3 milliseconds. This would be equivalent to a disk drive operating at 9000 RPM. Similarly, for a spindle spinning at 7200 RPM, latency due to dual recording would be equivalent to a spindle rotating at 14,400 RPM. In this regard, the invention minimally requires (a) out-of-phase recording the most recently referenced data strings multiple times in a band on the outer disk diameter, and (b) recording only once both the least recently or sequentially referenced data strings in a band on the inner disk diameter.

In the embodiment of FIG. 2, read and write requests or commands are received from host 1 and processed by processor 5 using a demand model resident in local device memory 303. As previously suggested, data strings may be stored in at least two or preferably three Groups A, B, and C according to a recency of usage discipline. These groups are written or stored into particularly located bands of contiguous tracks on designated disk surfaces. These may also be thought of as levels in a hierarchy of data strings ranging from Level-1 225 through Level-3 221. The levels correspond to the three Groups A, B, and C. It should be appreciated that the accessing of the HDA is under control of the processor 5 through the servo loop 7 and 221, as are the activities of the data path 3.

In the FIG. 2 embodiment, the three Groups A, B, C are written over one or more disks. As mentioned before, the data strings in Group A are the ones most recently referenced and are out-of-phase recorded multiple times on a band of extra-wide tracks on the outside diameter of a disk following a ZDR scheme. Further, the data strings in Group B are the ones next most recently referenced. The Group B data strings are out-of-phase recorded multiple times on a band of tracks of usual width located elsewhere on the same disk as Group A, such as on an inner diameter of the disk. However, they could also be placed on another disk surface. Lastly, the data strings in Group C are by far the largest in number. The Group C data strings are either least recently referenced or are sequentially referenced. The Group C members are written only one time each on one or more bands of tracks of usual width. Again, Group C data strings could be recorded on several surfaces and toward the innermost diameter of the disk.

Figure 3:
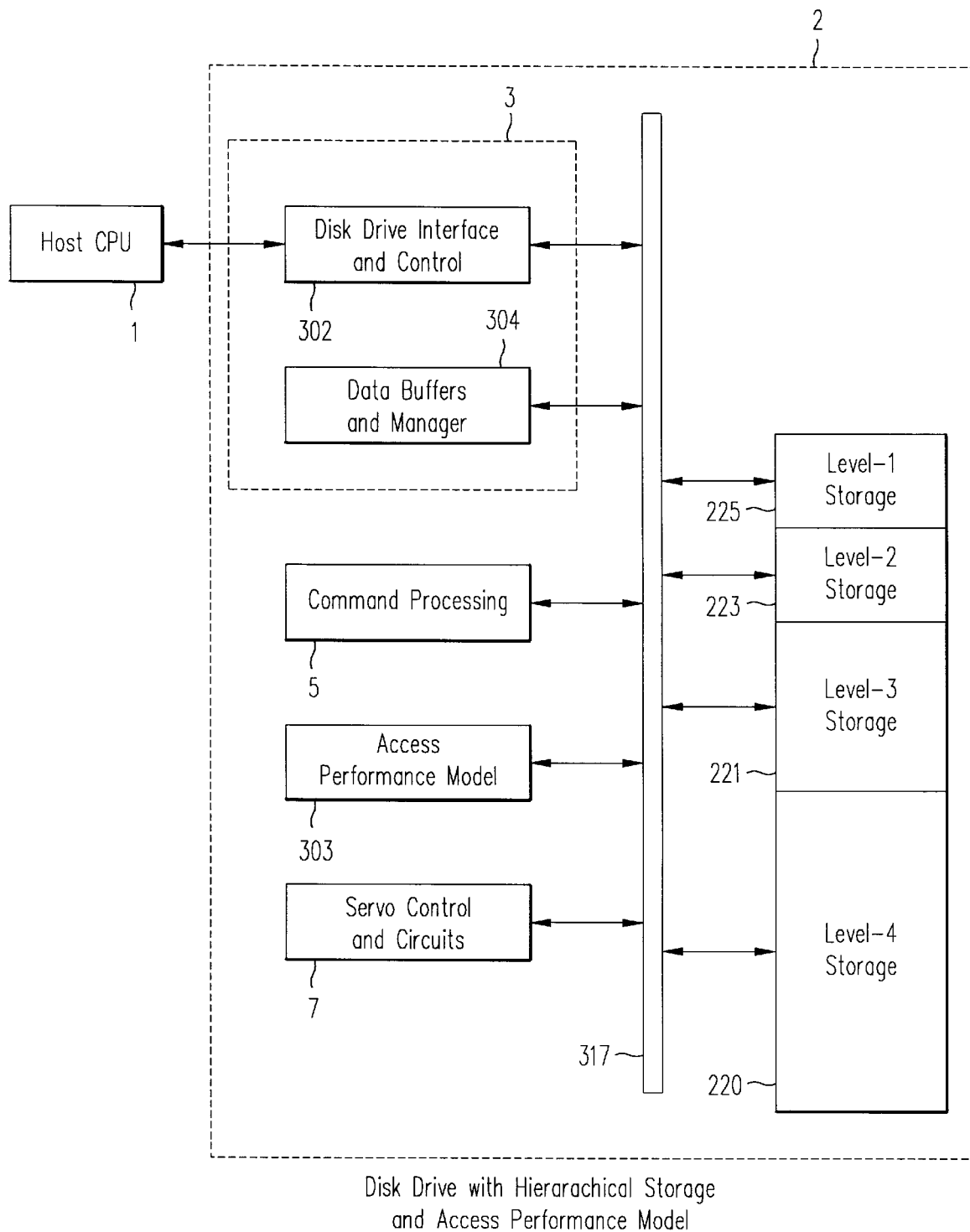
FIG. 3 sets out a logical flow of control for a hierarchically organized disk drive running under an access performance model according to the invention.

Referring now to FIG. 3, there is shown a logical flow of control for a hierarchically organized disk drive running under an access performance model 303 according to the invention and illustrating bus connection 317 among the principal elements. In this embodiment, a Level-1 storage 225 provides the highest access performance, while a Level-4 storage 220 provides the lowest performance but contains the largest storage capacity. The demand model, discussed in connection with the embodiment shown in FIG. 2, is replaced by a data performance access model (DAPA) 303.

DAPA 303 is a function within the disk drive 2 for facilitating data access optimization by the host computer 1. In the FIG. 3 embodiment, the HDA contains five disks over which four data storage groups are recorded and designated as A, B, C, and D.

Illustratively, the four storage Groups A–D or Levels 1–4 in the FIG. 3 embodiment are distributed over the five disks as follows:

(1) Group A is located on the outside diameter (OD) zones of both surfaces of disk 1 and designated as Level-1 data storage.

(2) Group B is written on the inner diameter (ID) zones of both surfaces of disk 1.

(3) Group C is based in the OD zones of other disk surfaces within the disk areas of disks 2–5.

(4) Group D is the lowest level storage and is recorded in the ID zones of disks 2–5.

Minimizing Access Time of Group A Data Strings

Figure 5:
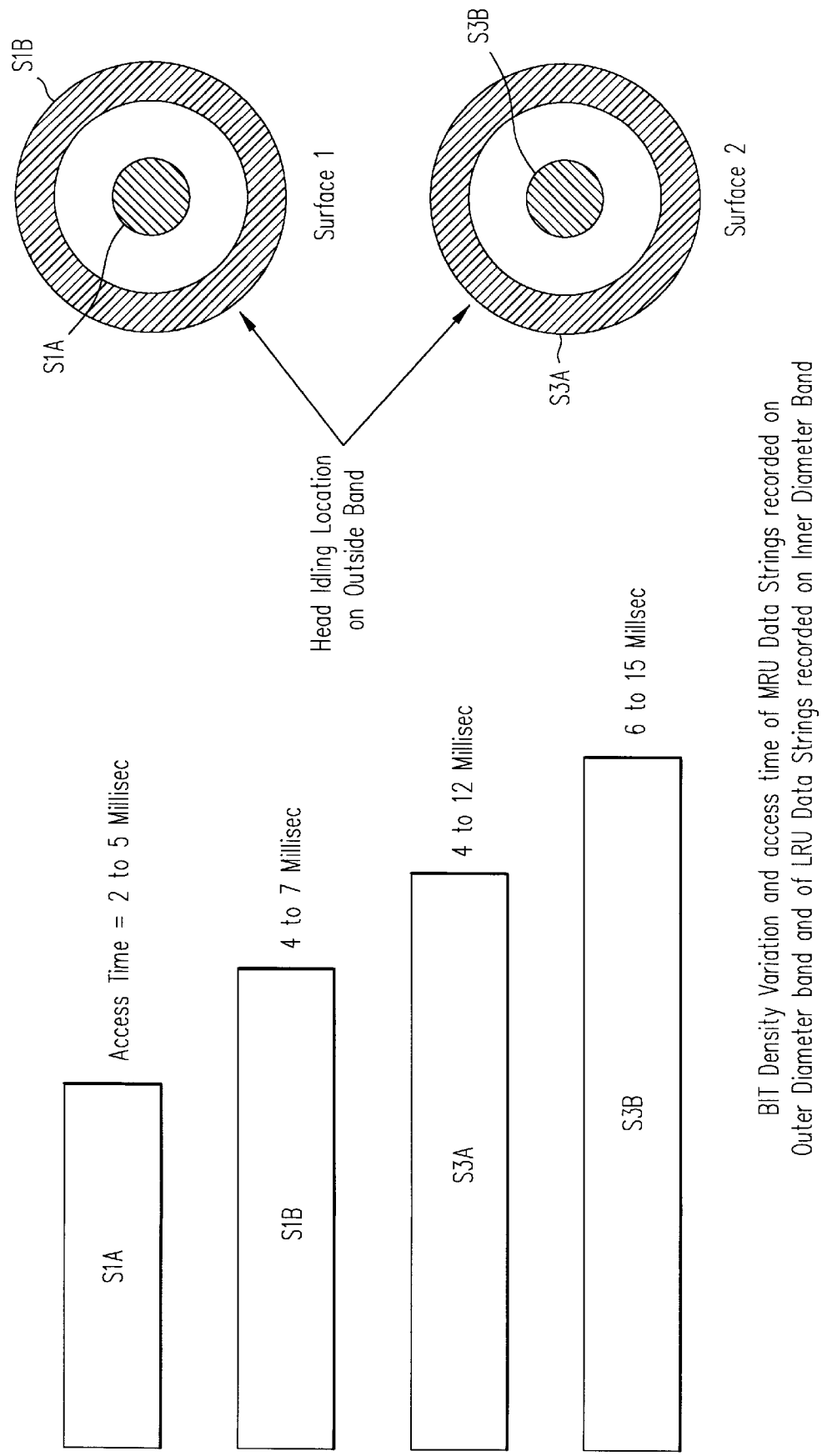
FIG. 5 shows recording density variation and access time of MFU/MRU and LFU/LRU data strings as a function of their location on a disk surface.

In the FIG. 3 embodiment, the data strings in Group A are accessed in the shortest possible time. In order to achieve this result, Group A data strings are written on wide tracks with high bandwidth servo control and a combination of redundant recording schemes mentioned earlier. The tracks are also located in the OD band of the disk drive to take advantage of the higher packed data due to data banding or zone data recording. This reduces the requirement of moving magnetic heads from track to track, therefore increasing the performance for accessing OD tracks. The data accessing from and to Group A is further reduced by selecting a head idling position (or a neutral or reference head position) at the middle of the Group A disk surface which is at one-fourth of the full stroke position from the outermost tracks in the disk surfaces as shown in FIG. 5. This technique further reduces average seek and settling time within the storage Group A. Since one-third of the full stroke seek and settling time is often used to estimate an average head move time, the average move time is reduced and equals about one-sixth of the full stroke seek and settling time, which is typically less than 3 milliseconds.

Out-of-Phase Recording of Data Strings in Groups A and B and Data Banding for Groups A–D In the embodiment of FIG. 3, the recording of data strings for Groups A and B employs a redundant scheme which requires a mirror image recording dual write with a redundant copy recorded 180 degrees out of phase on the same track. The lost storage capacity due to dual recording is partially compensated for with higher track and/or linear densities allowed by redundant recording to arrive at the same SER as a single copy. This is taught in the aforementioned Anderson U.S. Pat. No. 5,422,761.

The data band recording is provided for on all disk surfaces, i.e., Groups A–D. By applying the data banding scheme, the theoretical recording efficiency of the outermost tracks is two times higher than innermost tracks (3.5-inch drive) and would result in a mean increase of storage capacity of 40 percent from OD zone tracks to ID zone tracks. This is taught by Harris, U.S. Pat. No. 5,422,763, "Split Field Zone Data Recording", issued Jun. 6, 1995. Harris teaches the use of a method for estimating the occurrence of a servo field in a track eliminating table lookup and related processing. This permits a very accurate reading of the track data and denser recording. Parenthetically, disk surfaces containing Groups C and D have a higher number of radial tracks per inch (TPI) than the Group A and B surfaces.

Slow Servo Seek, Increased TPI for Groups C and D, and Layout of Groups

Dual-track format is not applied in Groups C and D, but with slow servo seek operations will be employed for reduced track misregistration (TMR) and increased track density. For an estimated 50 percent track density increase and accounting for 50 percent of redundant data lost in Groups A and B, the overall data capacity would be increased accordingly. By slowing down the servo seek and settling operations for Group C storage, with an added few millisecond delay, the settling TMR will be minimized which enables a high track density. Some characteristics of Group A storage are retained with Group C, such as idling at the middle of the group track for reducing the accessing time and with closely packed OD banding data storage.

Referring to FIG. 5, there is shown recording density variation and access time of MFU/MRU and LFU/LRU data strings as a function of their location on a disk surface for Groups A–D in the FIG. 3 embodiment. The S1A storage is contained within Group A which provides the shortest data accessing time. The data accessing performance for Group B (S1B), Group C (S3A), and Group D (S3B) are also illustrated with the same diagram.

Figure 4:
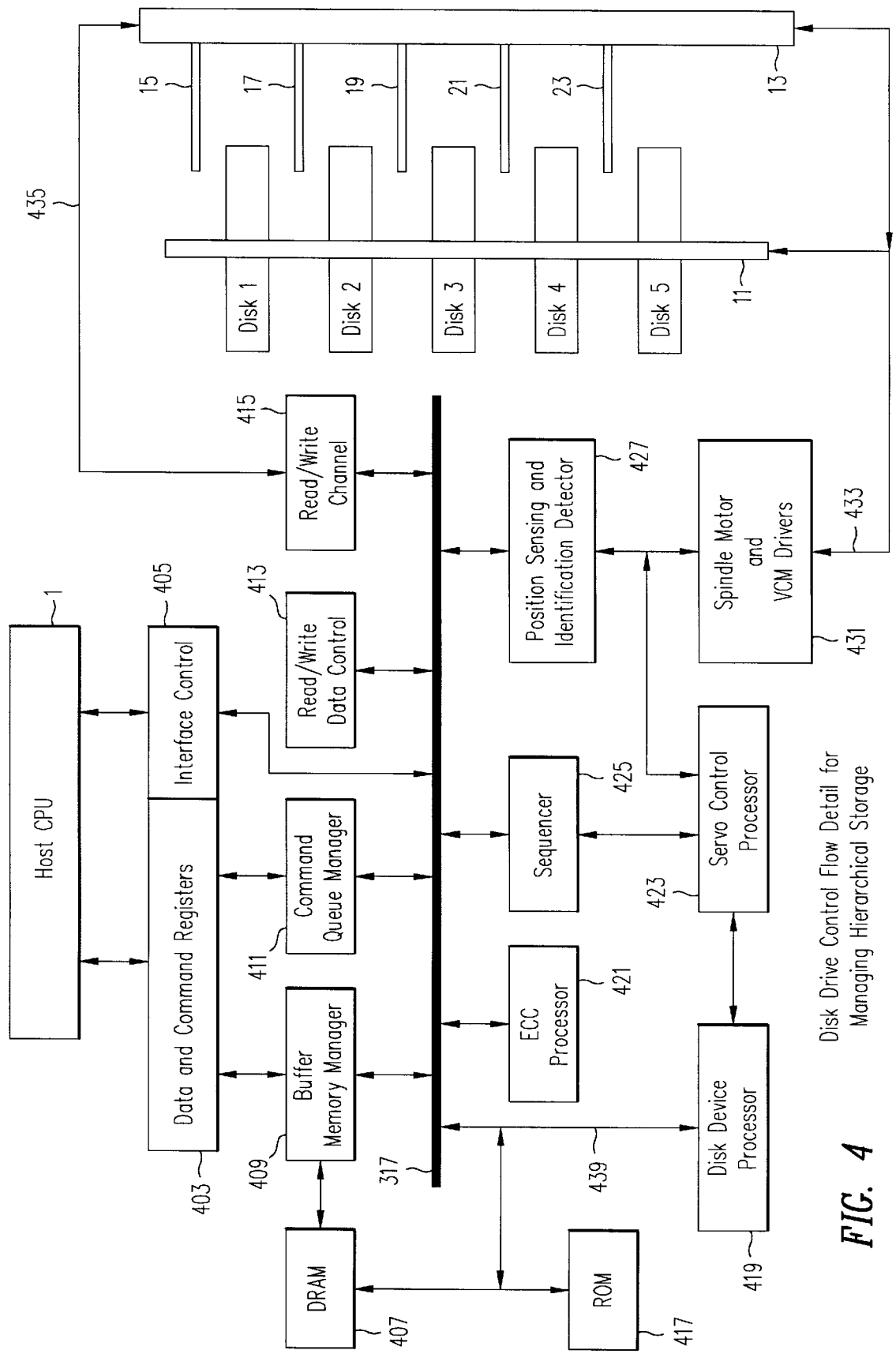
FIG. 4 illustrates a detailed logical block diagram for managing a hierarchically organized disk drive.

Referring now to FIG. 4, there is shown a detailed logical block diagram for managing a hierarchically organized disk drive. The host CPU 1 is attached to the disk, drive over an SCSI-managed interface. The interface includes command registers 403 and data I/O protocol control logic circuit 405. These handle command and data transfer between the host 1 and read and write data control 413 and command managers 411 and 419 within the disk drive. The command manager performs sorting and reordering of host commands within the time interval required for a fast response. The memory manager conducts the data access of read and write data buffers, including a section of a dual-write data buffer from the DRAMs by arbitration between the SCSI control circuit, read/write control circuit, microsequencer, command manager, and the local CPU.

The sequencer 425 is a programmable state machine with on-chip RAM and an ALU which provides the main control of memory-managing signals, including multisegment cache data transfer and search for data requests plus segment status. Sequencer 425 manages base buffer address tables, servo position target address, logical and physical address verification and conversion for storage Groups A–D, provides data allocation, directory map and performance entry calculations, and updating. The access address direction of head positioning for data transfer between the storage groups is also provided by the sequencer. In addition, it provides timing control for data R/W, ID detection, ECC, and servo controls.

The read/write control circuit 413 handles parallel/serial data conversion and produces NRZ data for the PMRL recording data within the read/write channel 415. The PMRL circuit within the read/write channel 415 supports data-banded data recording over a specified frequency range and delivers RLL data signals to arm electronics 18 associated within the HDA. Furthermore, the read/write channel 415 provides a finite impulse response (FIR) partial response equalization and Viterbi maximum likelihood data detection for data read operations. The ECC processor 421 performs data error calculation and correction utilizing a Reed-Solomon algorithm.

The servo position sensing and sector/track ID detection circuit 427 serves servo pattern position sending for servo control processor 423. The detection circuit 427 provides critical signal and timing detection for index, sector marker, cylinder address, and sector address with a sector servo embedded ID format. Additional detail may be found in Best et al., U.S. Pat. No. 5,500,848, "Sector Servo Data Recording Disk Having Data Regions Without Identification (ID) Fields", issued Mar. 19, 1996. The servo control digital signal processor 423 (DSP) conducts closed-loop controls of track, seeking, settling, and track following with an adjustable control bandwidth and seek profiles according to the target position input and position sensing with track ID inputs. The servo control microcode also provides head positioning calibration, initialization, and idling position managing. The disk device processor 419, with program data stored within the ROM 417 and a part of the DRAM section 407, provides main control of the hard disk processing within various circuit blocks and can be used for calibration and optimization of the system operation and performance.

The access performance control facility depicted as a single block 303 in FIG. 3 is actually a distributed function in the FIG. 4 embodiment. This function is also managed by the sequencer 425 by updating a data directory map, including a performance model or measurements. The map is used for the local CPU or host computer 1 to direct storage hierarchy functions for data access performance managing. The directory map is updated with a new entry produced by the sequencer 425 after each data string or block transfer for each disk storage group. The directory map is normally backed up by the local CPU function to specified data tracks in the Group A or B disk areas which are not available for host customer data storage. A reloading operation is performed by the CPU 1 at power-up time to the map buffering location.

For illustrative purposes, a logical address map or directory is shown in the table. This table contains ten entries for the Group A storage. Each entry represents a data string or block in the disk storage. Each entry contains an address tag, block name or ID, block size, delta track distance to the reference track (the desired idling track as described above) in track counts, and magnitudes corresponding to the frequency of usage or recency of occurrence or equivalent ordering discipline. These entries facilitate the performance model or measurement since it can be directly related to data access performance without needing extra on-line calculation performed by the host or local CPU.

| Address Tag | Block Name/ID | Block Size | Track Distance Delta to Reference Track | Frequency of Occurrence | Recency of Occurrence |
|---|---|---|---|---|---|
| xxxx | D1 | Yyyyy | Zzzzzz | 9544 | 961130 |
| xxxx | D2 | Yyyyy | Zzzzzz | 8322 | 980208 |
| xxxx | D3 | Yyyyy | Zzzzzz | | |
| xxxx | D4 | Yyyyy | Zzzzzz | | 970322 |
| xxxx | D5 | Yyyyy | Zzzzzz | 0278 | |
| xxxx | D6 | Yyyyy | Zzzzzz | | 980418 |
| xxxx | D7 | Yyyyy | Zzzzzz | 7763 | |
| xxxx | D8 | Yyyyy | Zzzzzz | 4456 | |
| xxxx | D9 | Yyyyy | Zzzzzz | 6689 | |
| xxxx | D10 | Yyyyy | Zzzzzz | 2134 | |

Two pointers are used with the map for each storage group. The pointers are maintained to indicate the muency used (MFU) and least frequency used (LFU) data blocks. The pointers can be accessed by the disk device processor 419 or the host CPU 1. The MFU and LFU data sets are good candidates for data migration between the multilevel data storage groups. The delta track to the reference track can also be used by the device processor 419 or the host 1 for measurements and evaluations of data access performance. However, the host performance managing would be more dependable to the individual operating system used and its operations with the high-level data set allocation format. The performance model can also be used for host command reordering decisions for data access activities of the multilevel hierarchy. For purposes of completeness, it should be appreciated that the groups can be organized on a recency of usage basis. That is, the referencing of the data strings in Groups A–D form a least recently used (LRU) ordering, and migrations among the bands can be governed accordingly.

It is another extension of this invention that the idle position of the transducer attached to the HDA be configured to be opposite the outside band of each disk surface. The outside band or diameter location of the transducer contrasts with the midband idle position advocated in Jerbic, U.S. Pat. No. 5,422,762, "Method and Apparatus for Optimizing Disk Performance by Locating a File Directory on a Middle Track and Distributing the File Allocation Tables Close to Clusters Referenced in the Tables", issued Jun. 6, 1995.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A method for optimizing access to addressable data strings stored on a cyclic, multitracked disk drive, said drive including an arrangement for accessing one or more tracks and for streaming the data strings to and from a device and among selective ones of the tracks, the method comprising the steps of:

(a) recording data strings on at least a first disk surface of the disk drive in bands of concentric tracks in an order selected from a set consisting of most frequently used (MFU) to least frequently used (LFU) and most recently used (MRU) to least recently used (LRU) order among the bands and generating a logical address map thereof, the recording step including:

(1) out-of-phase replicating each MFU/MRU data string n times on at least one track in at least a first band of such tracks, said first band being located substantially toward the outer diameter of said first disk surface of the disk drive, and (2) solely replicating each LFU/LRU data string on at least one track in at least a second band of such tracks, said second band being located elsewhere on said disk surface; and (b) accessing said MFU/LFU or MRU/LRU stored data strings from the counterpart bands of tracks on the first disk surface or elsewhere according to said address map and responsive to external commands, and selectively migrating data strings among the bands to maintain a selective MFU/LFU or MRU/LRU ordering of data strings among the bands consistent with said map.

2. The method according to claim 1, wherein the step of (a1) recording each of the MFU/MRU data strings includes a step selected from a set of steps consisting of (1) dual recording an MFU/MRU data string 180 degrees out of phase about a first track in the first band, and (2) recording an MFU/MRU data string on the first track in the first band on the first disk surface and recording a copy of the MFU/MRU data string on the first track in the first band of the second disk surface but out of phase by 180 degrees.

3. The method according to claim 1, wherein the step of recording MFU/MRU and LFU/LRU data strings includes recording data strings at a track density in bits per inch varying directly as its diametric distance from the disk axis of rotation.

4. The method according to claim 1, wherein the step of defining the logical map includes forming a concordance in which entry represents a data string, each entry containing an address tag, block name or ID, block size, track distance to a reference track, and frequency of occurrence or recency of usage information.

5. A method for optimizing access to coded indicia stored on at least one surface of a cyclic, multitracked recording device, said device including a data path and a command path, the data path coupling the recording surface for either sensing coded indicia from selected tracks and transferring a copy to a data sink or for transferring coded indicia from a data source and for writing the indicia out to selected tracks, the command path being responsive to external instructions for regulating the data path, comprising the steps of:

(a) defining a plurality of bands of tracks and generating a logical address map thereof on at least one surface with distinguishable access time characteristics for storing coded indicia, the bands being arranged in an inverse access time staging/destaging order, the coded indicia being migrated among the bands according to a demand model, said demand model accounting for band capacity, frequency of occurrence or recency of usage, sequentiality of address, and data type; and (b) executing at least one function in the command path from a set of functions consisting of accessing coded indicia from or to at least one track in at least one band and migrating said indicia among the bands according to the demand model and the logical address map.

6. The method according to claim 5, wherein the device comprises at least a first and a second synchronous cyclic, multitrack recording surface, and further wherein the step of (a) defining bands of tracks further includes the steps of:

(a1) dual recording of a first string of coded indicia in a first band of concentric tracks located on the outside diameter of the first surface; and (a2) sole recording of a copy of the first string in a second band of concentric tracks located elsewhere on the first or second surface.

7. The method according to claim 5, wherein the step of (a1) dual recording is one selected from the set consisting of:
   (1) recording the first string of coded indicia on a first track in the first band on the first surface and recording a copy of the first string also on the first track in the first band but out of phase by a predetermined angle; and
   (2) recording a first string on the first track in the first band on the first surface and recording a copy of the first string on the first track in the first band of the second surface but out of phase by a predetermined angle.

8. The method according to claim 5, wherein the step of (b) executing at least one function in the command path includes the step of recording coded indicia at a track density in bits per inch varying directly as its diametric distance from the disk axis of rotation.

9. The method according to claim 5, wherein the step of (b) executing at least one function in the command path includes the step of migrating coded indicia among the bands according to the demand model and the logical address map such that sequentially accessed, coded indicia including raster-scanned data, graphic images or the like are stored in the band containing coded indicia of least frequent or least recent usage.

10. A method for optimizing access to addressable data strings stored on a plurality of disk surfaces in a cyclic, multitracked disk drive, each disk surface having an inner and an outer diameter, comprising the steps of:
    (a) recording one or more data strings in counterpart tracks and generating a logical address map thereof on at least at first disk surface, a predetermined number of tracks on each disk surface constituting a band, there being formed at least a first and a second band, the data strings being stored in a designated one of the bands according to an access discipline as a function either of frequency of occurrence or recency of usage and sequentiality including:
       (1) out-of-phase recording multiple times randomly accessed data strings selected form a set consisting of the most frequently used (MFU) or most recently used (MRU) data strings, said multiple recording being made on the tracks of the first band, said first band being located substantially toward the outer diameter of a disk surface, and
       (2) solely recording the least frequently used (LFU) or the least recently used (LRU) randomly accessed data strings and the sequentially accessed data strings on the tracks of the second band elsewhere on a disk surface; and
    (b) accessing at least one data string from the counterpart first or second bands of tracks responsive to external commands in accordance with said map and selectively migrating one or more data strings among the bands to maintain an ordering of data strings among the bands according to either the frequency of usage or recency of usage and sequentiality of access discipline and said address map.

11. A storage device comprising:
    (a) a cyclic, multitracked recording mediums having at least a first and second disk surface;
    (b) a logical map comprising addresses of data strings recorded on at least the first disk surface of the disk drive in bands of contiguous tracks in an order selected from a set consisting of either most recently used (MRU) to least recently used (LRU) or most frequently used (MFU) to least frequently used (LFU) order among the bands, said logical map defining the location of:
       (1) a first band of contiguous tracks comprising MFU/MRU data strings, each MFU/MRU string being out-of-phase replicated n times on one of the counterpart tracks, said first band being located substantially toward the outer diameter of said first disk surface of the disk drive, and
       (2) a second band of contiguous tracks comprising LFU/LRU data strings, each LFU/LRU string being solely recorded on one of the counterpart tracks, said second band being located elsewhere on said disk surface;
    (c) a data path coupling the first and second disk surface for either sensing coded indicia from selected tracks and transferring a copy to a data sink or for transferring coded indicia from a data source and for writing the indicia out to selected tracks; and
    (d) a command processing path for accessing said MFU/MRU or LFU/LRU stored data strings from the counterpart bands of tracks on the first disk surface or elsewhere according to said address map and responsive to external commands, and for selectively migrating data strings among the bands to maintain a selective MRU/LRU or MFU/LFU ordering of data strings among the bands consistent with said map.

12. The storage device according to claim 11, wherein the tracks of the first band upon which the MFU/MRU data strings are recorded and sited substantially toward the outer diameter of the first disk surfaces are of greater radial width than the tracks of the second band upon which the LFU/LRU data strings are recorded and sited.

13. The storage device according to claim 11, wherein said data path comprises:
    at least one arm supporting a read/write transducer-tipped suspension disposed opposite the first disk surface; and
    an electromechanical arrangement responsive to signals from said command processing path and coupling said arm for causing the transducer to change its radial position with respect to the tracks on the first disk surface, said transducer having an idle position and an active position, the idle position being substantially adjacent to the outer diameter of the surface.

14. An article of manufacture comprising a machine-readable memory having stored therein indicia of a plurality of processor executable control program steps for optimizing access to addressable data strings stored on a plurality of disk surfaces in a cyclic, multitracked disk drive, said plurality of indicia of control program steps including:
    (a) indicia of a control program step for recording one or more data strings in counterpart tracks and generating a logical address map thereof on at least a first disk surface, a predetermined number of tracks on each disk surface constituting a band, there being formed at least a first and a second band, the data strings being stored in a designated one of the bands according to an access discipline as a function either of frequency of occurrence or recency of usage and sequentiality including:
       (1) out-of-phase recording multiple times randomly accessed data strings selected from a set consisting of the most frequently used (MFU) or most recently used (MRU) data strings, said multiple recording being made on the tracks of the first band, said first band being located substantially toward the outer diameter of a disk surface, and (2) solely recording the least frequently used (LFU) or the least recently used (LRU) randomly accessed data strings and the sequentially accessed data strings on the tracks of the second band elsewhere on a disk surface; and (b) indicia of a control program step for accessing at least one data string from the counterpart first or second bands of tracks responsive to external commands in accordance with said map and selectively migrating one or more data strings among the bands to maintain an ordering of data strings among the bands according to either the frequency of usage or recency of usage and sequentiality of access discipline and said address map.

* * * * *